July 24, 1956  A. B. TAYLOR  2,756,289
ELECTRICAL COLLECTOR SYSTEMS
Filed July 28, 1952
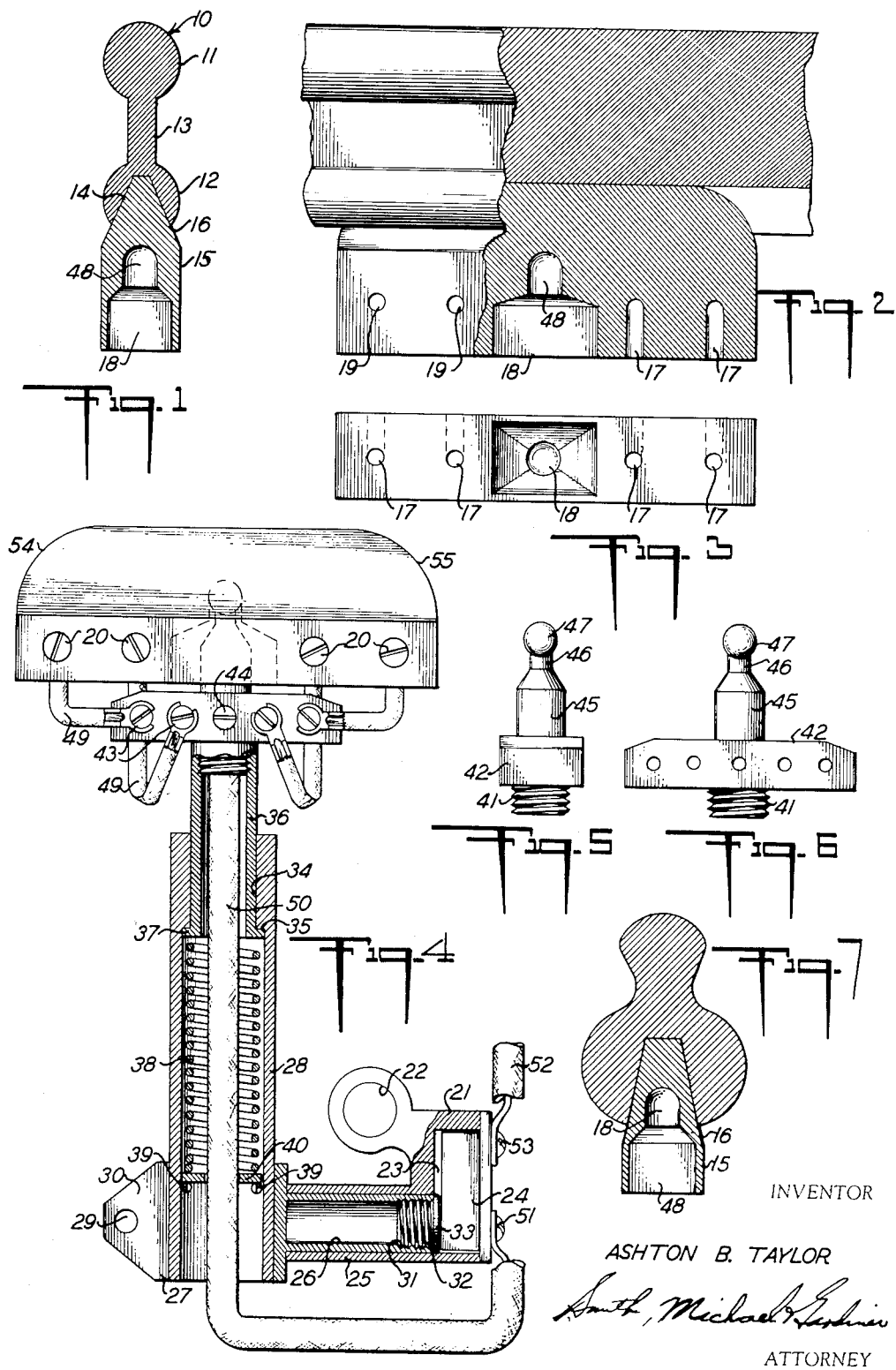
INVENTOR
ASHTON B. TAYLOR
ATTORNEY United States Patent Office 2,756,289
Patented July 24, 1956

2,756,289

ELECTRICAL COLLECTOR SYSTEMS

Ashton B. Taylor, Mount Lebanon, Pa.

Application July 28, 1952, Serial No. 301,416

13 Claims. (Cl. 191—59.1)

This invention relates to trolley systems and more particularly to current collectors involving a sliding shoe engaging a current-carrying bus bar in such manner that large areas of contact are provided to enable the collector to handle current demand loads far in excess of conventional collectors.

The present invention is applicable wherever current collectors are used such as for traversing cranes, ore bridges, monorail hoisting and conveying systems, mine and power applications, portable tools, hot and cold slab cars, and many other instances, and has for its principal object the provision of a simple, cheaply-constructed, relatively inexpensive, and highly efficient collector which can carry current loads which cause failures in devices presently in use.

An important object of the invention is to provide a novel form of current-carrying bus bar which is formed of extruded and rolled copper or the like and is provided with an inverted truncated V-shaped groove in an edge thereof which cooperates with a sliding, metallic shoe having a correspondingly truncated V-shaped edge throughout its length closely fitting said groove thereby greatly to increase the area of contact between the bus bar and shoe.

A further object is to provide a bus bar and sliding shoe combination so constructed that as wear takes place on either the bus bar or shoe, it is compensated for so that long life is insured.

Another object of this invention is to provide a sliding shoe which is yieldingly urged into contact with its cooperating bus bar so that proper contact is maintained throughout the life of the collector and under all conditions of use.

Still another object is to mount the sliding shoe so that it has universal movement and can consequently follow any and all irregularities, undulations, etc., that may be present in the bus bar.

Another object is to mount the sliding collector shoe on a swivel so that it is free to swing laterally or from side to side as the collector slides along the bus bar in the event that the bus bar is not in alignment throughout its length.

Other objects and advantages will be clearly apparent as the description proceeds, it being understood that only a preferred form is here illustrated, and that changes in size, shape, materials, and other details may be resorted to, so long as they fall within the spirit and scope of the appended claims.

In the majority of present day trolley systems, a current carrying trolley wire is suspended overhead, and the collector is in the form of a trolley wheel having a grooved periphery. However, in installations of this kind, it is found that the area of contact between the trolley wheel and wire is so small that it is inefficient in operation and cannot carry high current loads. It is to overcome these difficulties that the present collector has been designed.

Referring now in detail to the drawings,

Fig. 1 is a vertical, sectional view through one form of bus bar and collecting shoe, Fig. 2 is a side elevation of Fig. 1, parts being shown in section, Fig. 3 is a bottom plan view of the collector shoe, Fig. 4 is a side elevation partially in section and showing the mounting for the collector shoe, Fig. 5 is an end view of the collector terminal block, Fig. 6 is a side elevation of Fig. 5, and Fig. 7 is a view corresponding to Fig. 1, but showing a modified form of bus bar.

In the drawings, the numeral 10 indicates a web type, current-carrying bus bar which comprises an upper lobe 11 which is circular in cross section and a similar lower lobe 12 connected by an intermediate web 13. This bus bar may be constructed of any suitable metal, but I prefer copper for this purpose. In the lower edge of the bus bar 10 there is provided an inverted, truncated V-shaped groove 14 which extends throughout the length of the bus bar.

It will be understood that the bus bar 11 may be suspended in any suitable way, but the conventional manner is to provide clamps which encircle the upper lobe 11 and are spaced along the length of the bus bar. Cooperating with this bus bar is a sliding collector shoe which consists of a solid, metallic block 15, preferably of copper alloy of suitable hardness, which is provided at its upper edge with an inverted, truncated V-shaped surface 16 corresponding in shape to the groove in the bus bar 10 and which snugly fits said groove throughout the length of the collector shoe.

The collector shoe 15 is bored through its bottom face to provide spaced sockets 17 and a mounting stud receiving socket 18. The collector shoe 15 is also provided with recesses 19 extending through a side wall thereof and communicating with the sockets 17, the recesses being threaded for the reception of wire clamping screws 20.

Referring now to Fig. 4, the mounting for the collector shoe is shown as consisting of a bracket 21 having an eye 22 therein by means of which the bracket may be mounted on any suitable support. The bracket 21 is provided at its rear end with a recess 23 for the reception of a terminal block 24, and it is likewise provided with a tubular extension 25 forming a bearing for a swivel connection with the collector shoe. Mounted within the tubular extension 25 is a tubular bearing 26 forming part of a clamp 27 which encircles a main supporting tube 28 and is clamped therein by means of screws passing through openings 29 in bifurcated ears 30, only one of which is shown in Fig. 4.

The tubular bearing 26 is threaded at its rear end as at 31 for the reception of a screw block 32 having an enlarged head 33 which engages the wall of the recess 23, and thereby prevents the bearing 26 from sliding out of the tubular extension 25.

The main supporting tube 28 has a reduced bore 34 forming a shoulder 35, and mounted in the reduced bore 34 is a second insulated supporting tube 36 provided with a flange 37 at its lower end cooperating with the shoulder 35 so as to limit upward movement of the insulated tube 36. Mounted within the main supporting tube 28 is a spring 38 bearing at its upper end against the flange 37 and urging the same toward the shoulder 35.

At the lower end of the main supporting tube 28 a plurality of cotter pins 39 are passed transversely through the same and support a washer 40 which engages the opposite end of the spring 38.

The insulated tube 36 is interiorly threaded at its upper end for the reception of the screw threaded stud 41 integral with the collector terminal block 42. This metal block 42 is provided at its side face with openings for the reception of the shunt wire clamping screws 43 and the main wire clamping screw 44 as clearly seen in Fig. 4.

Projecting upwardly from the collector terminal block 42 is a stud 45 provided with a reduced neck 46 and terminating in a sphere 47 at its upper end. As clearly seen in Fig. 4, the spherical end 47 sits in a reduced socket 48 forming an extension of the enlarged socket 18 so that by this construction, the collector shoe 15 is free to rock in all directions during its operation.

Connection is made between the collector shoe 15 and the collector terminal block 42 by means of shunt wires 49, and the main wire 50 is secured at one end to the collector terminal block by means of the screw 44 and extends downwardly through the insulated tube 36, the main supporting tube 28, and through the washer 40. It then projects out of the lower end of the tube 28 and is attached to the terminal block 24 by means of the screw 51. From the terminal block 24 the current is conveyed to the motor by means of a lead 52 secured to the terminal block by means of a screw 53.

From the foregoing it will be seen that with the collector mounted in position, the spring 38 yieldingly urges the collector shoe into engagement with the bus bar, so that contact is made throughout the full area of the groove in the bus bar, and that this area is maintained notwithstanding irregularities in the bus bar due to its yielding engagement by the collector shoe. It will be further seen that by mounting the collector shoe 15 by means of a ball and socket joint, it is capable of universal movement. Furthermore, because of the rounded leading and trailing edges 54 and 55 of the collector shoe, it may easily ride over obstructions such as joints between the various sections of the bus bar.

Due to the swivel bearing 26 rotating in the tubular extension 25, it is obvious that the collector shoe may swing from side to side to accommodate irregularities in alignment of the bus bar, and that consequently provision is made for full contact between the bus bar and collecting shoe under any and all conditions of use.

It will be obvious that current from the shoe flows through the shunt wires 49, the terminal block 42, and the main wire 50, and thence to the motor through the lead 52.

The present construction provides a current collector which is extremely simple, cheap, and efficient, and since the area of contact between the bus bar and collector is greatly multiplied, it is capable of handling loads which could not be handled by conventional trolley systems. Furthermore, it is obvious that due to the configuration of the grooves and the mating edge of the bus bar, as wear takes place the spring 38 maintains the proper contact by forcing the shoe into firm engagement with the groove.

I claim:

1. In a current collector, the combination of a bus bar comprising an elongated, rigid, metallic bar having in its lower edge a truncated, inverted V-shaped groove extending throughout its length all of the walls of the groove being flat, planar surfaces, a sliding shoe engaging said bus bar and comprising an elongated, metallic block having its upper edge shaped to correspond to the shape of the groove in the bus bar.

2. In a current collector, the combination of a bus bar comprising an elongated, rigid, metallic bar having in its lower edge a truncated, inverted V-shaped groove extending throughout its length all of the walls of the groove being flat, planar surfaces, a sliding shoe engaging said bus bar and comprising an elongated, metallic block having its upper edge shaped to correspond to the shape of the groove in the bus bar, and means for forcing said shoe toward the bus bar to provide full contact between the shoe and bus bar.

3. In a current collector, the combination of a bus bar comprising an elongated, rigid, metallic bar having in its lower edge a truncated, inverted V-shaped groove extending throughout its length all of the walls of the groove being flat planar surfaces, a sliding shoe engaging said bus bar and comprising an elongated, metallic block having its upper edge shaped to correspond to the shape of the groove in the bus bar, and yielding means for forcing said shoe toward the bus bar to provide full contact between the shoe and bus bar.

4. In a current collector, the combination of a bus bar comprising an elongated, metallic bar having in its lower edge a truncated, inverted V-shaped groove extending throughout the length thereof, a collector shoe comprising an elongated, metallic block having its upper edge lying within said groove and shaped to conform thereto, a collector shoe terminal block having a stud projecting therefrom and terminating in a spherical ball, said shoe having a socket therein to receive said ball and permit universal movement of said shoe, and means for supporting said collector terminal block.

5. In a current collector, the combination of a bus bar comprising an elongated, metallic bar having in its lower edge a truncated, inverted V-shaped groove extending throughout the length thereof, a collector shoe comprising an elongated, metallic block having its upper edge lying within said groove and shaped to conform thereto, a collector shoe terminal block having a stud projecting therefrom and terminating in a spherical ball, said shoe having a socket therein to receive said ball and permit universal movement of said shoe, means for supporting said collector terminal block, and means for yieldingly urging said terminal block into said socket and for forcing said shoe into said groove in the bus bar.

6. In a current collector, the combination of a bus bar comprising an elongated, rigid, metallic bar having in its lower edge a truncated, inverted V-shaped groove extending throughout the length thereof, a collector shoe comprising an elongated, metallic block having its upper edge lying within said groove and shaped to conform thereto, a support for said shoe, means for mounting said shoe on said support by a universal joint to permit rocking of said shoe in all directions, and means for mounting said shoe support to permit lateral movement of the same relative to the bus bar.

7. In a current collector, the combination of a bus bar comprising an elongated, metallic bar having in its lower edge a truncated, inverted V-shaped groove extending throughout the length thereof, a collector shoe comprising an elongated, metallic block having its upper edge lying within said groove and shaped to conform thereto, a collector shoe terminal block having a stud projecting therefrom and terminating in a spherical ball, said shoe having a socket therein to receive said ball and permit universal movement of said shoe, means for supporting said collector terminal block, and shunt wires connecting said sliding shoe with the collector terminal block whereby the shoe may rock without affecting distribution of current to the collector terminal block.

8. In a current collector, the combination of a bus bar comprising an elongated, metallic bar having in its lower edge a truncated, inverted V-shaped groove extending throughout its length, a collecting shoe slidably engaging said bus bar and comprising an elongated, metallic block having its upper edge shaped to conform to the groove in the bus bar and projecting thereinto, a support for said shoe comprising a mounting bracket carrying a terminal block at one end and a tubular extension at the other, a bifurcated clamp carrying a bearing member rotatably mounted in said extension, a main supporting tube secured in said clamp and projecting toward said bus bar, an insulated tube telescoped within said main tube and a spring anchored in said main tube and urging the insulated tube toward said bus bar, a collector terminal block secured to the upper end of said insulated tube and carrying thereon a stud terminating in a ball, said shoe having a socket for receiving said ball to mount the shoe for universal movement and shunt wires connecting said shoe and collector terminal block, said shoe being also connected by a main lead to the terminal block in said mounting bracket.

9. In a current collector, the combination of a rigid bus bar element and a shoe element engaging said bar and comprising an elongated metallic block slidably engaging said bus bar, one of said elements being provided along its engaging edge with a continuous V-shaped groove and the other of said elements having its engaging edge correspondingly shaped to snugly fit said groove.

10. In a current collector, the combination of a rigid bus bar element and a shoe element engaging said bar and comprising an elongated metallic block slidably engaging said bus bar, one of said elements being provided along its engaging edge with a continuous V-shaped groove and the other of said elements having its engaging edge correspondingly shaped to snugly fit said groove, a support for said shoe comprising a mounting bracket, a main supporting tube secured to said bracket and projecting toward said bus bar, said tube being pivotally mounted on said bracket for movement transversely of the bus bar, an insulated tube telescoped within the main tube and a spring in said main tube and urging the insulated tube toward said bus bar, a collector terminal block secured to the upper end of said insulated tube and carrying thereon a stud terminating in a ball, said shoe having a socket for receiving said ball to mount the shoe for universal movement, and shunt wires connecting said shoe and collector terminal block, said shoe also being connected to a main lead extending through said main and insulated tubes.

11. In a current collector, the combination of a bus bar comprising an elongated, metallic bar having in its lower edge a groove extending throughout the length thereof, a collector shoe comprising an elongated, metallic block having its upper edge lying within said groove and shaped to conform thereto, a collector shoe terminal block having a stud projecting therefrom and terminating in a spherical ball, said shoe having a socket therein to receive said ball and permit universal movement of said shoe, and means for supporting said collector terminal block.

12. In a current collector, the combination of a bus bar comprising an elongated, metallic bar having in its lower edge a groove extending throughout the length thereof, a collector shoe comprising an elongated, metallic block having its upper edge lying within said groove and shaped to conform thereto, a collector shoe terminal block having a stud projecting therefrom and terminating in a spherical ball, said shoe having a socket therein to receive said ball and permit universal movement of said shoe, and means for supporting said collector terminal block, and means for yieldingly urging said terminal block into said socket and for forcing said shoe into said groove in the bus bar.

13. In a current collector, the combination of a bus bar comprising an elongated, metallic bar having in its lower edge a groove extending throughout the length thereof, a collector shoe comprising an elongated, metallic block having its upper edge lying within said groove and shaped to conform thereto, a collector shoe terminal block having a stud projecting therefrom and terminating in a spherical ball, said shoe having a socket therein to receive said ball and permit universal movement of said shoe, and means for supporting said collector terminal block, and shunt wires connecting said sliding shoe with the collector terminal block whereby the shoe may rock without effecting distribution of current to the collector terminal block.

References Cited in the file of this patent

UNITED STATES PATENTS

| 27,978 | Fox | Apr. 24, 1860 |
| 560,098 | Keighley | May 12, 1896 |
| 867,021 | Drawert | Sept. 24, 1907 |
| 917,500 | Steinberger | Apr. 6, 1909 |
| 1,089,957 | Potter | Mar. 10, 1914 |
| 2,044,886 | Larsson | June 23, 1936 |
| 2,049,403 | Wolf | July 28, 1936 |
| 2,422,132 | Saiter | June 10, 1947 |
| 2,548,986 | Mayer | Apr. 17, 1951 |

OTHER REFERENCES

"Extruded Aluminum Shapes and Mouldings," The Michigan Copper and Brass Co., Detroit, Michigan, publisher.

"Aluminum Mouldings," Aluminum Co. of America, Pittsburg, Pennsylvania, publisher.